March 17, 1959  G. A. LYON  2,878,072
WHEEL COVER
Filed April 29, 1955
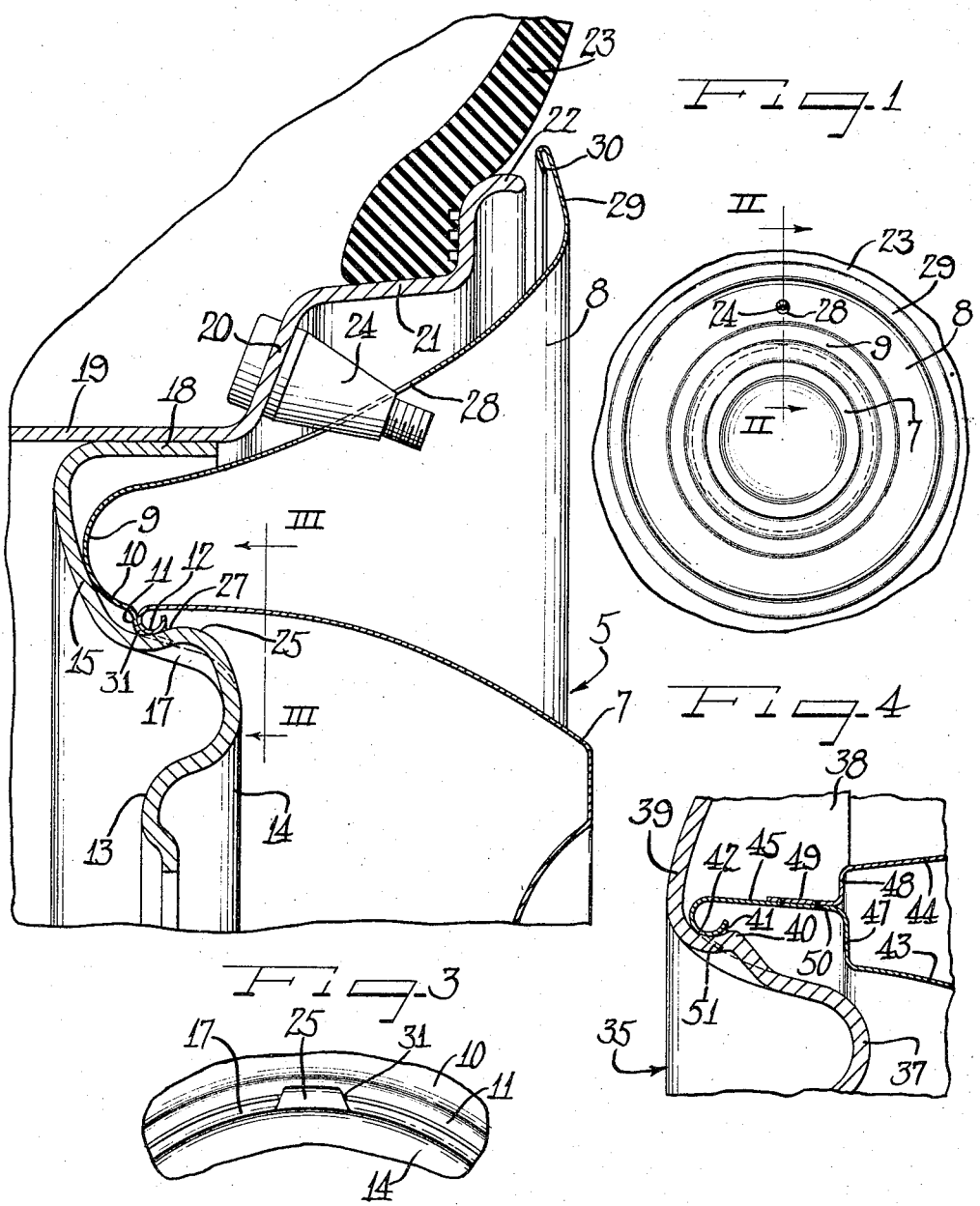
Inventor
George Albert Lyon United States Patent Office 2,878,072
Patented Mar. 17, 1959

2,878,072

WHEEL COVER

George Albert Lyon, Detroit, Mich.

Application April 29, 1955, Serial No. 504,977

2 Claims. (Cl. 301—37)

The present invention relates to improvements in wheel structures and more particularly concerns the ornamental and protective covering of the outer sides of vehicle wheels.

An important object of the present invention is to provide an improved wheel structure having novel means for cooperative retaining relation with a wheel cover.

Another object of the invention is to provide in a wheel structure an improved relationship between a wheel body and a wheel cover whereby to enable an unusually deep draw appearance for the cover affording a high crown and a high outer marginal portion with a deep intermediate annular recess therebetween, while yet keeping the axially outwardly projecting portions of the cover well within safe limits with respect to the outer side of the wheel.

Another object of the invention is to provide for an improved wheel cover assembly for disposition at the outer side of a vehicle wheel.

It is a further object of the invention to provide means in a wheel structure enabling unusually deep insetting of a wheel cover assembly.

Other objects, features and advantages of the present invention will be readily apparent from the following detailed description of certain preferred embodiments thereof taken in conjunction with the accompanying drawing, in which:

Figure 1 is an outer side elevational view of a wheel structure embodying features of the invention;

Figure 2 is an enlarged fragmentary radial sectional view taken substantially on the line II—II of Fig. 1;

Figure 3 is a fragmentary elevational detail view taken substantially in the plane of line III—III of Fig. 2; and Figure 4 is a fragmentary radial sectional view through a wheel structure showing a modification.

Having reference to Figs. 1, 2 and 3, a wheel cover assembly 5 is shown including an inner circular crown cover member 7 in the form of a deep walled hub cap cooperable with an outer annular trim ring cover member 8 having a generally axially extending body portion with a slight radial slope and terminating at its inner margin in a deeply dished annular inset portion 9 from which extends radially inwardly and axially outwardly a marginal flange 10 provided with an offset axially outwardly facing annular shoulder 11 spaced from its terminus and adapted for engagement by an underturned extremity bead 12 of the hub cap 7.

In assembly, the cover members 7 and 8 provide what would appear to be a full cover that has an unusually deeply drawn intermediate annular portion. The depth of such intermediate portion, however, virtually precludes drawing of a single blank to such a depth, and it is therefore expedient to make the cover in two parts.

The cover assembly 5 is adapted to be applied in snap-on, pry-off relation to the outer side of a vehicle wheel that accommodates the deeply axially inwardly inset portion 9 of the outer cover member 8. To this end, the wheel includes a disk spider wheel body 13 having a shallow axially outwardly projecting annular nose bulge 14 at the radially outer side of which is a circular inset groove portion 15 defined at its radially inner side by a generally radially outwardly facing side wall 17 of the nose bulge 14 and at its radially outer side by a generally axially outwardly extending attachment flange 18 defining the periphery of the wheel body.

Supported by the wheel body is a tire rim having a base flange 19 secured in suitable fashion to the attachment flange 18 of the wheel body and merging with a side flange 20 facing generally axially outwardly and leading into an intermediate flange 21 from which extends a terminal flange 22 of the tire rim. A pneumatic tire 23 is supported by the tire rim and may be of the tubeless type shown or may be a tire and tube assembly. For inflating the tire the valve stem 24 is supported by the side flange 20 and projects generally axially outwardly.

The deeply indented annular groove formation 15 at the margin of the wheel body accommodates the deeply inset portion 9 of the cover. It will be observed that thereby the indented portion 15 of the wheel body and the inset portion 9 of the cover are accommodated near the median plane of the wheel. On the other hand, the projecting portion of the crown of the hub cap 7 and the outer marginal portion of the wheel cover member 8 which overlies the tire rim terminal flange 22 in assembly will project not far beyond the tip of the terminal flange and will be disposed within the plane across the maximum lateral outward bulge of the tire 23 in service. This avoids danger of damage to the projecting parts of the wheel by curbing or the like.

For retaining the cover 5 on the wheel, the radially outer side wall 17 of the nose bulge of the wheel body is provided with retaining bumps 25 which are pressed radially outwardly therein and may comprise three or four circumferentially spaced bumps. At their axially inner sides the retaining bumps have generally axially inwardly and radially outwardly facing retaining shoulders 27 behind which the edge bead 12 of the hub cap 7 is retainingly engageable in snap-on, pry-off relation. For accommodating the bumps 25, the terminal portion of the flange 10 is notched out as at 31 (Fig. 3) to thus lie at opposite sides of the respective retaining bumps 25 and hold the cover against turning so that the valve stem 24 projecting through an aperture 28 in the cover member 8 will not be distorted by turning of the cover on the wheel.

The construction and relationship is such that when the retaining bead 12 is in engagement with the bump shoulders 27, it thrusts in firm seating axially inwardly pressing relation against the shoulder or ledge 11 of the outer cover member and thereby presses the inset annular portion 9 of the outer cover member firmly against the groove portion 15 of the wheel body. Thereby, the annular outer cover member 8 is locked in place by the inner cover member and more particularly the retaining bead 12 thereof.

At its outer marginal extremity, the annular outer cover member is provided with a turned flange portion 29 which has an underturned reinforcing and finishing bead flange 30.

In applying the cover assembly 5 to the outer side of the wheel, the outer annular cover member 8 is first put into position concentrically upon the wheel with the valve stem 24 registered through the valve stem opening 28 and with the retaining bumps 25 accommodated in the cutouts or notches 31 in the flange 10. Then the inner crown cover or hub cap member 7 is applied to the outer side of the wheel by snapping the retaining bead 12 over the bumps 25 which it will be observed are located with the shoulders 27 down in the groove defined between the nose bulge 14 and the outer marginal flange 18 of the wheel body.

It will be observed in Figure 2 that the flange 10 which is directed toward the retaining bumps 25 has at the notches 31 means to retain the cover member 8 against turning on the wheel, such means comprising edges defining the notches 31 on the generally axially outwardly projecting portion of the flange 10 beyond the shoulder 11 and lying against the radially outwardly facing wheel body side wall 17.

To remove the cover 5 from the wheel, the hub cap 7 is first pried free from the retaining bumps 25, and then the annular outer cover member 8 can be removed.

In the modification of Fig. 4, a wheel body 35 has an annular nose bulge 37 and a radially outer axially outwardly extending attachment flange 38 with a deeply inset annular groove dished portion 39 defining a channel opening axially outwardly. In the radially outer wall defining the nose bulge 37, is a series of cover retaining bumps 40 having generally axially inwardly facing retaining shoulders 41 that are disposed well down within the groove and in fact in this instance spaced only a short distance from the inset wheel body portion 39.

The retaining bumps 40 are retainingly engageable by a resilient inner extremity retaining bead 42 on a cover assembly including a circular inner cover member 43 and a circular radially outer cover member 44.

The cover members 43 and 44 are preferably in this instance assembled and secured together as a unit. To this end, the inner cover member has a generally axially inwardly extending marginal flange 45 at the inner end of which the bead 42 is provided and of a diameter to encircle the retaining bumps 40 in spaced relation. At the axially outer end of the flange 45 is an offsetting generally radially inwardly extending portion 47 which is generally aligned with a radially outwardly extending offsetting portion 48 at the inner margin of the cover member 44 and from which projects an axially inwardly flange 49 which is secured as by means of welding 50 to the radially outer side of the inner cover member flange 45. The offsetting flange portions 47 and 48 cooperate to define for the inner and outer cover members an intermediate deeply dished annular portion which as will be observed, lies deep within the wheel.

Application and removal of the cover of Fig. 4 is effected by snapping the bead 42 over the bumps 40, and removal of the cover is effected by prying the bead free from the bumps 40.

In order to retain the cover against turning on the wheel, the retaining bead 42 is provided at suitable intervals such as at opposite sides of one of the bumps 40 with generally radially inwardly and axially outwardly projecting stop fingers 51 that may be struck from a portion of the bead to confront opposite sides of the adjacent retaining bump.

It will be understood that modifications and variations may be effected without departing from the scope of the novel concepts of the present invention.

I claim as my invention:

1. In a wheel structure including a tire rim and a disk spider wheel body supporting the tire rim and having an outer marginal generally axially outwardly extending attachment flange secured to a base flange on the tire rim and said attachment flange being joined to a deeply inset annular portion of the wheel body defined at the radially inner side thereof by a generally axially outwardly projecting annular nose bulge lying substantially within a plane across the axially outer terminus of the base flange of the tire rim, the nose bulge having an annular series of generally radially outwardly projecting and cover retaining bumps disposed in said inset and opposing said attachment flange with generally radially outwardly and axially inwardly facing shoulders on said bumps located substantially axially inwardly relative to the axially outer extremity of said attachment flange, a cover structure for the outer side of the wheel including a circular axially inwardly extending portion extending into said wheel inset and having retaining terminal means thereon retainingly engageable with the shoulders of said bumps in press-on, pry-off relation, said cover structure projecting axially outwardly to a substantial distance beyond said nose bulge and affording a deeply drawn appearance for the cover without projecting too far in a practical sense relative to the axially outermost extremity of the tire rim, said cover structure including a second portion separably related to said retaining terminal and having a radially inner shoulder portion seated in the bottom of said inset and radially inwardly therefrom a generally radially inwardly and axially outwardly projecting flange with a shoulder offset generally axially outwardly relative to said shoulder portion and retainingly engaged by said terminal and thereby holding said terminal in pressed-on engagement with the retaining bumps, said second cover portion extending at its radially outer side into overlying relation to the tire rim.

2. In a wheel structure including a tire rim and a disk spider wheel body supporting the tire rim and having adjacent to the tire rim a substantially inset groove-like portion with a generally axially outwardly projecting annular nose bulge radially inwardly from the groove-like portion and provided with generally radially outwardly projecting retaining bumps having generally radially outwardly and axially inwardly facing retaining shoulders spaced from the bottom of said groove-like portion, a central circular cover member having a retaining bead terminal engageable resiliently in press-on, pry-off relation with said bump shoulders, and an annular radially outer cover member for overlying the tire rim and having an inner annular generally hook-shaped marginal portion shouldering into the bottom of said groove-like portion and having a generally radially inwardly and axially outwardly projecting annular terminal portion spaced axially outwardly from said bottom and providing an axially outwardly facing shoulder offset from said bottom and disposed adjacent to said bump shoulders and engageable by said retaining bead for thereby maintaining the annular outer cover member seated in said groove-like portion and said annular cover member shoulder maintaining said bead in retained tensioned engagement with the bump shoulders and spaced from said bottom.

References Cited in the file of this patent

UNITED STATES PATENTS

| 1,864,969 | White | June 28, 1932 |
| 2,263,243 | Lyon | Nov. 18, 1941 |
| 2,445,330 | Lyon | July 20, 1948 |
| 2,544,703 | Lyon | Mar. 13, 1951 |